United States Patent
Tsuchiya

(10) Patent No.: US 11,189,115 B2
(45) Date of Patent: Nov. 30, 2021

(54) METHOD OF SHOWING EXPLANATION ABOUT WARNING LIGHT AND PROGRAM FOR SHOWING EXPLANATION ABOUT WARNING LIGHT

(71) Applicant: TOYOTA JIDOSHA KABUSHIKI KAISHA, Toyota (JP)

(72) Inventor: Yuichiro Tsuchiya, Tama (JP)

(73) Assignee: TOYOTA JIDOSHA KABUSHIKI KAISHA, Hsygta (JP)

( * ) Notice: Subject to any disclaimer, the term of this patent is extended or adjusted under 35 U.S.C. 154(b) by 142 days.

(21) Appl. No.: 16/527,781

(22) Filed: Jul. 31, 2019

(65) Prior Publication Data

US 2020/0074772 A1 Mar. 5, 2020

(30) Foreign Application Priority Data

Aug. 31, 2018 (JP) .............................. JP2018-162811

(51) Int. Cl.
- *G07C 5/00* (2006.01)
- *G07C 5/08* (2006.01)
- *G06Q 10/00* (2012.01)

(52) U.S. Cl.
CPC ........... *G07C 5/0816* (2013.01); *G06Q 10/20* (2013.01); *G07C 5/008* (2013.01); *G07C 5/085* (2013.01)

(58) Field of Classification Search
CPC ...... G07C 5/0816; G07C 5/008; G07C 5/085; G07C 5/0825; G06Q 10/20; G08B 5/36; G08B 21/18
See application file for complete search history.

(56) References Cited

U.S. PATENT DOCUMENTS

| | | | |
|---|---|---|---|
| 9,002,554 B2 * | 4/2015 | Chen | G07C 5/008 701/22 |
| 2008/0316009 A1 | 12/2008 | Nagata | |

(Continued)

FOREIGN PATENT DOCUMENTS

| | | |
|---|---|---|
| CN | 101783964 A | 7/2010 |
| CN | 105915702 A | 8/2016 |
| JP | 2002-109690 A | 4/2002 |

(Continued)

OTHER PUBLICATIONS

Car Warning Lights App. Product Description [online], eArio, 2018 [retrieved on Feb. 27, 2021], Retrieved from the Internet <URL:https://web.archive.org/web/20180406155303/http://carwarninglight.com/#show[Feb. 27, 2021 3:06:07 PM]> (Year: 2018).*

(Continued)

*Primary Examiner* — Peter D Nolan
*Assistant Examiner* — Peter Y Ning
(74) *Attorney, Agent, or Firm* — Oliff PLC

(57) ABSTRACT

A method of showing an explanation about a warning light includes: acquiring a captured image that captures a warning light of a vehicle; analyzing the captured image acquired and identifying the warning light included in the captured image; causing information that explains about the identified warning light to be displayed; causing information related to the identified warning light to be transmitted to a predetermined external device; and selecting a maintenance facility or a support center for the vehicle based on the information on the identified warning light.

3 Claims, 3 Drawing Sheets

(56) References Cited

U.S. PATENT DOCUMENTS

2016/0078691 A1* 3/2016 Roepke ................ H04W 88/02
                                                    701/31.5
2016/0247333 A1* 8/2016 Rockwell ............. G07C 5/0808

FOREIGN PATENT DOCUMENTS

JP          2002-140797 A      5/2002
JP          2006-193138 A      7/2006

OTHER PUBLICATIONS

SUBARU Manual Application, https://subaru.jp/afterservice/app/subarumanual/.
Audi's AR car manual App. https://japanese.engadget.com/2013/08/18/ar-ekurzinfo-iphone/.
Holding up AI illustrated book App. https://www.value-press.com/pressrelease/206311.
Benz, AR application manual of the luxury car model, https://www.moguravr.com/benz-ar/.
Hyundai Virtual Guide, https://apps.apple.com/jp/app/hyundai-virtual-guide/id1116861416.
BMW Driver's Guide App. https://auto-becker-klausmann.de/8-akutuelles/33-bmw-driver-s-guide-app-smart-scan.html.

* cited by examiner

METHOD OF SHOWING EXPLANATION ABOUT WARNING LIGHT AND PROGRAM FOR SHOWING EXPLANATION ABOUT WARNING LIGHT

BACKGROUND OF THE INVENTION

1. Field of the Invention

The present disclosure relates to a technology of providing information for explaining about a warning light provided in a vehicle.

2. Description of the Related Art

Patent document 1 discloses a vehicle status monitoring apparatus provided with a status information discriminating means for discriminating whether a detection signal detected in a target of monitoring in the vehicle indicates a normal status or an abnormal status and a status information display means for displaying the discriminated status information on a display screen.

[Patent document 1] JP2002-140797

A driver of a vehicle provided with a warning light cannot sometimes know how to deal with an abnormality that occurs in the vehicle even when seeing that a warning light is turned on.

SUMMARY OF THE INVENTION

A purpose of this disclosure is to provide a technology for presenting a driver with information for properly dealing with a vehicle status indicated by a warning light.

A method of showing an explanation about a warning light according to an embodiment of the present disclosure includes: acquiring a captured image that captures a warning light of a vehicle; analyzing the captured image acquired and identifying the warning light included in the captured image; causing information that explains about a vehicle status indicated by the identified warning light to be displayed; and causing at least one of information related to the identified warning light and the captured image acquired to be transmitted to a predetermined external device.

The embodiment allows the driver to understand the content of the warning light by causing information that explains about the identified warning light to be displayed. Further, transmitting information related to the identified warning light to a predetermined external device allows the external device to address the situation with the recognition of a vehicle status.

The method may further include: selecting a maintenance facility or a support center for the vehicle based on the vehicle status indicated by the identified warning light. Causing the at least one of information related to the identified warning light and the captured image acquired to be transmitted includes causing the at least one of information related to the identified warning light and the captured image acquired to be transmitted to a predetermined external device provided in the maintenance facility or the support center for the vehicle.

A program for showing an explanation about a warning light according to another embodiment includes computer-implemented module including: a module that acquires a captured image that captures a warning light of a vehicle; a module that analyzes the captured image acquired and identifies the warning light included in the captured image; a module that causes information that explains a vehicle status indicated by the identified warning light to be displayed; and a module that causes at least one of information related to the identified warning light and the captured image acquired to be transmitted to a predetermined external device.

The embodiment allows the driver to understand the content of the warning light by causing information that explains about the identified warning light to be displayed. Further, transmitting information related to the identified warning light to a predetermined external device allows the external device to address the situation with the recognition of a vehicle status.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1A:
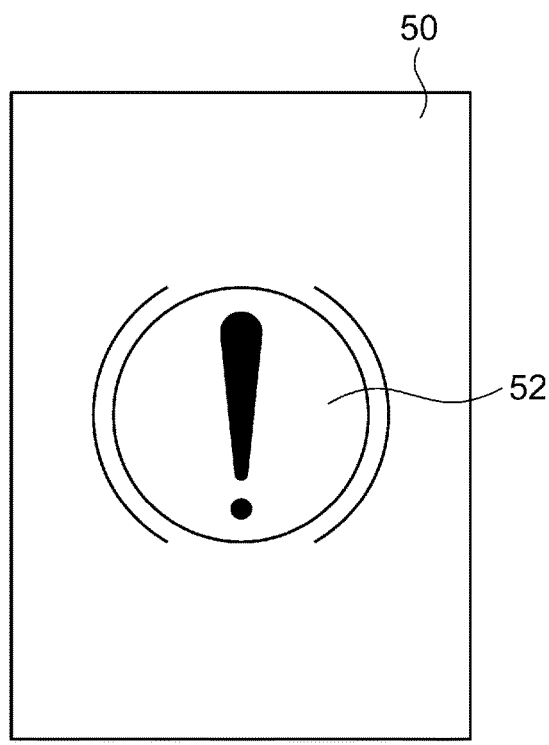
FIGS. 1A and 1B show images for illustrating a method of showing an explanation about a warning light according to an embodiment.
Figure 1B:
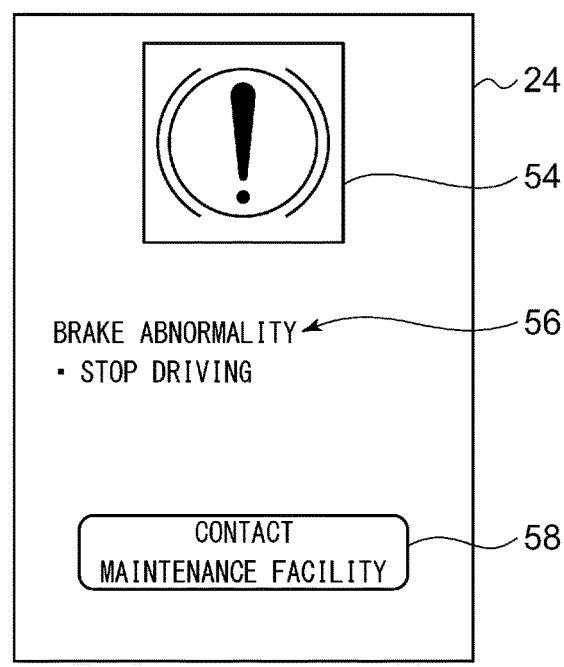

FIGS. 1A and 1B show images for illustrating a method of showing an explanation about a warning light according to an embodiment. FIG. 1A shows a captured image 50 capturing a red warning light 52. The instrument panel of a vehicle is provided such that a plurality of types of warning lights can be turned on. When one of the warning lights is turned on, the driver may not know the content indicated by the warning light accurately. The warning light may be a lamp turned on or may be shown on a display as being turned on. The warning light may be turned on in a plurality of colors to show different vehicle statuses depending on the color turned on. Other warning lights can be turned on or caused to flash optionally.

When the driver captures an image of the warning light turned on by using a camera of a mobile terminal device, the mobile terminal device analyzes the captured image and causes information explaining about the vehicle status indicated by the imaged warning light to be displayed. FIG. 1B shows an image displayed on a display 24 of the mobile terminal device.

The display 24 displays a model image 54 of the warning light, explanatory information 56 on the warning light, and a user operation area 58 for making a contact. The model image 54 shows the warning light 52 identified in the captured image 50. The explanatory information 56 shows the vehicle status indicated by the identified warning light 52 in a text format. The user operation area 58 for making a contact is a button that enables making a contact to a maintenance facility. When the user performs a touch operation in the user operation area 58 for making a contact, the mobile terminal device is connected to the acknowledging unit of the maintenance facility, and the driver can enjoy the service to deal with the warning light 52 turned on.

Thus, by using a mobile terminal device to capture an image of a warning light of a vehicle turned on, the driver can access information on the vehicle status indicated by the warning light turned on and enjoy the service to deal with the warning light as necessary.

Figure 2:
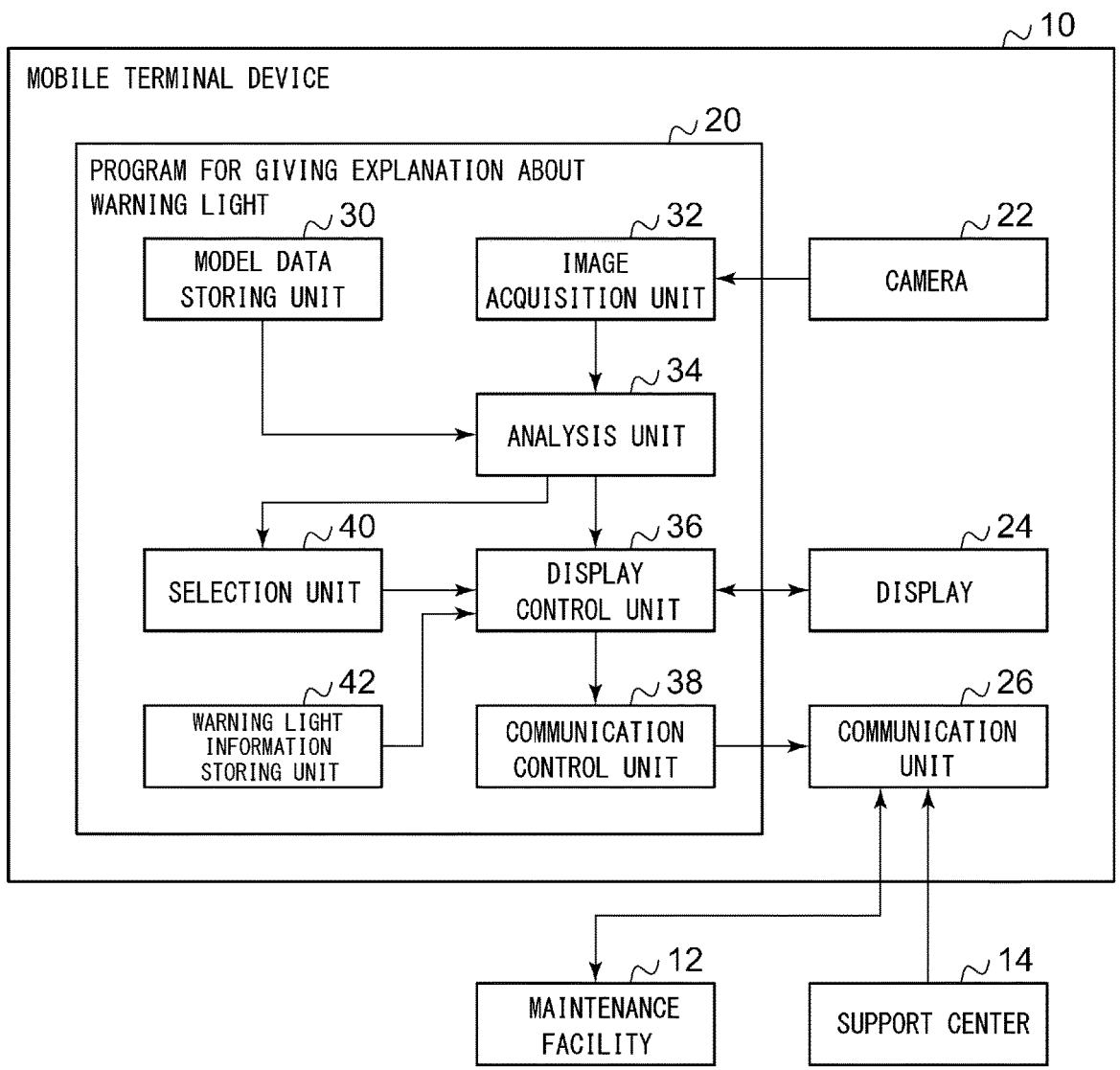
FIG. 2 illustrates a program for showing an explanation about a warning light provided in the mobile terminal device.

FIG. 2 illustrates a program 20 for showing an explanation about a warning light provided in the mobile terminal device 10. The elements depicted in FIG. 2 as functional blocks for performing various processes are implemented by hardware such as a circuit block, a memory, or other LSI's, and by software such as a program etc., loaded into the memory. Therefore, it will be understood by those skilled in the art that the functional blocks may be implemented in a variety of manners by hardware only, software only, or a combination of thereof, and the implementation is not limited to any particular form.

The driver possesses the mobile terminal device 10 and can capture an image of the warning light of the vehicle by using the mobile terminal device 10. The mobile terminal device 10 includes the program for showing an explanation about the warning light, a camera 22, the display 24, and a communication unit 26. The program 20 for showing an explanation about a warning light includes a model data storing unit 30, an image acquisition unit 32, an analysis unit 34, a display control unit 36, a communication control unit 38, a selection unit 40, and a warning light information storing unit 42.

The communication unit 26 of the mobile terminal device 10 can connect to the acknowledging unit of the maintenance facility 12 and the acknowledging unit of a support center 14 via a network. The acknowledging unit of the maintenance facility 12 and the acknowledging unit of a support center 14 are external apparatuses for contact to a human operator and exchange texts or sound with the mobile terminal device 10 of the driver.

The camera 22 can capture an image of the warning light according to the driver's user operation. The display 24 can display an image that explains about the warning light. The program 20 for showing an explanation about a warning light is an application program and provides information as shown in FIG. 1B that explains about the warning light.

The image acquisition unit 32 acquires the captured image captured by the camera 22. The captured image thus acquired includes the warning light turned on or flashing. To distinguish between the warning light turned on and the warning light flashing, the image acquisition unit 32 may acquire temporally successive captured images.

The model data storing unit 30 stores model data for the warning light used for analysis in the analysis unit 34. The model data for the warning light may be images for respective warning lights or feature parameters for respective warning lights. The feature parameter of the warning light may be information indicating the positional relationship with another warning light or another feature point, or shape data for a symbol shown in the warning light, or the like. The model data for the warning light may include images of warning lights having the same shape but different colors.

The analysis unit 34 analyzes the captured image thus acquired and identifies the warning light turned on or flashing in the captured image. The analysis unit 34 identifies the warning light turned on or flashing in the captured image by checking the image against the model data for the warning light. The analysis unit 34 sends the information on the warning light to the display control unit 36 as an analysis result. The analysis unit 34 identifies the type of warning light and also identifies the color of the warning light and whether the warning light is turned on or flashing.

The warning light information storing unit 42 stores explanatory information about the vehicle status indicated by the warning light. The explanatory information about the warning light explains the vehicle status indicated by the warning light and is embodied by text and/or sound data stored in the warning light information storing unit 42 for respective warning lights. The explanatory information about the warning light may differ depending on the color of the identified warning light or the operation of the warning light (turned on, flashing, etc.). The explanatory information about the warning light includes a response measure of the driver.

The selection unit 40 selects whether the driver should make a contact to the maintenance facility 12 or the support center 14 based on the vehicle status indicated by the identified warning light. The result of selection in the selection unit 40 is displayed as the user operation area 58 for making a contact, as shown in FIG. 1B. In the case the warning light indicating a serious abnormality that requires the vehicle to stop is turned on and the vehicle needs immediate maintenance, for example, the selection unit 40 selects the maintenance facility 12. When the warning light indicating a less serious abnormality such as shortage of washer fluid is turned on and the vehicle can travel a little further, the selection unit 40 may select the support center 14. When the warning light indicating that the door is half shut or the seat belt is not worn is turned on, the selection unit 40 does not select either the maintenance facility 12 or the support center 14. In essence, the selection unit 40 selects the maintenance facility 12 or the support center 14 depending on the seriousness of the vehicle trouble indicated by the warning light.

The selection unit 40 stores the contact information on the maintenance facility 12 and the support center 14 and stores contact information data that associates the analysis result of the analysis unit 34 with the maintenance facility 12 and the support center 14. Some types of warning lights are not associated with either the maintenance facility 12 or the support center 14. The selection unit 40 can select the maintenance facility 12 or the support center 14 by referring to the contact information data, based on the information on the identified warning light.

Depending on the vehicle status indicated by the warning light, the selection unit 40 acquires the position information on the mobile terminal device 10 and determines, of the maintenance facilities 12 registered in advance, to give guidance on the maintenance facility 12 located closest to the position of the mobile terminal device 10. Depending on the vehicle status indicated by the warning light, the selection unit 40 determines to give guidance on the maintenance facility 12 located closest to the address of the driver registered in advance. In other words, the selection unit 40 selects one of the plurality of maintenance facilities 12 based on the vehicle status indicated by the identified warning light. The selection unit 40 selects the maintenance facility 12 determined by the current position of the driver or the maintenance facility 12 determined by the address of the driver, based on the vehicle status indicated by the identified warning light.

The display control unit 36 generates an image by retrieving explanatory information that explains the vehicle status from the warning light information storing unit 42, based on the analysis result of the analysis unit 34 and displays the image on the display 24. As shown in FIG. 1B, the image generated by the display control unit 36 includes the model image 54, the explanatory information 56 on the warning light, and the user operation area 58 for making a contact. The model image 54 is retrieved from the model data storing unit 30, the explanatory information 56 on the warning light is retrieved from the warning light information storing unit 42, and the user operation area 58 for making a contact indicates the result of selection in the selection unit 40. This allows the driver to understand what abnormality is indicated by the warning light that is turned on.

The display control unit 36 causes the user operation area 58 for making a contact shown in FIG. 1B to be displayed, based on the result of selection in the selection unit 40, and displays user operation area 58 for making a contact that allows connection to the acknowledging unit of the maintenance facility 12 or the support center 14 selected by the selection unit 40. In this way, the driver who wishes to enjoy the service corresponding to the warning light that is turned can receive guidance on the proper service suitable for the type of the warning light, by capturing an image of the warning light.

The communication control unit 38 causes the information related to the identified warning light or the captured image acquired to be transmitted to the maintenance facility 12 or the support center 14 via the communication unit 26. The information transmitted by the communication control unit 38 to the maintenance facility 12 and the support center 14 may be comprised of both the information related to the identified warning light and the captured image acquired. When the display control unit 36 detects an input in the user operation area 58 for making a contact, the communication control unit 38 controls the communication unit 26 to connect to the acknowledging unit of the maintenance facility 12 or the support center 14.

In this way, proper contact information determined by the vehicle status indicated by the warning light can be provided to the driver. The operator of the maintenance facility 12 or the support center 14 contacted by the mobile terminal device 10 can recognize the vehicle status indicated by the warning light so that the driver can communicate smoothly with the operator. The operator at the maintenance facility 12 or the support center 14 seeing the vehicle status indicated by the warning light and transmitted from the mobile terminal device 10 can transmit guidance information that recommends maintenance of the vehicle to the communication unit 26 even if the driver has not made a contact. The guidance information includes the position and contact information of the maintenance facility 12 and is displayed on the display 24 by the display control unit 36. This prompts the driver to maintain the vehicle properly.

Figure 3:
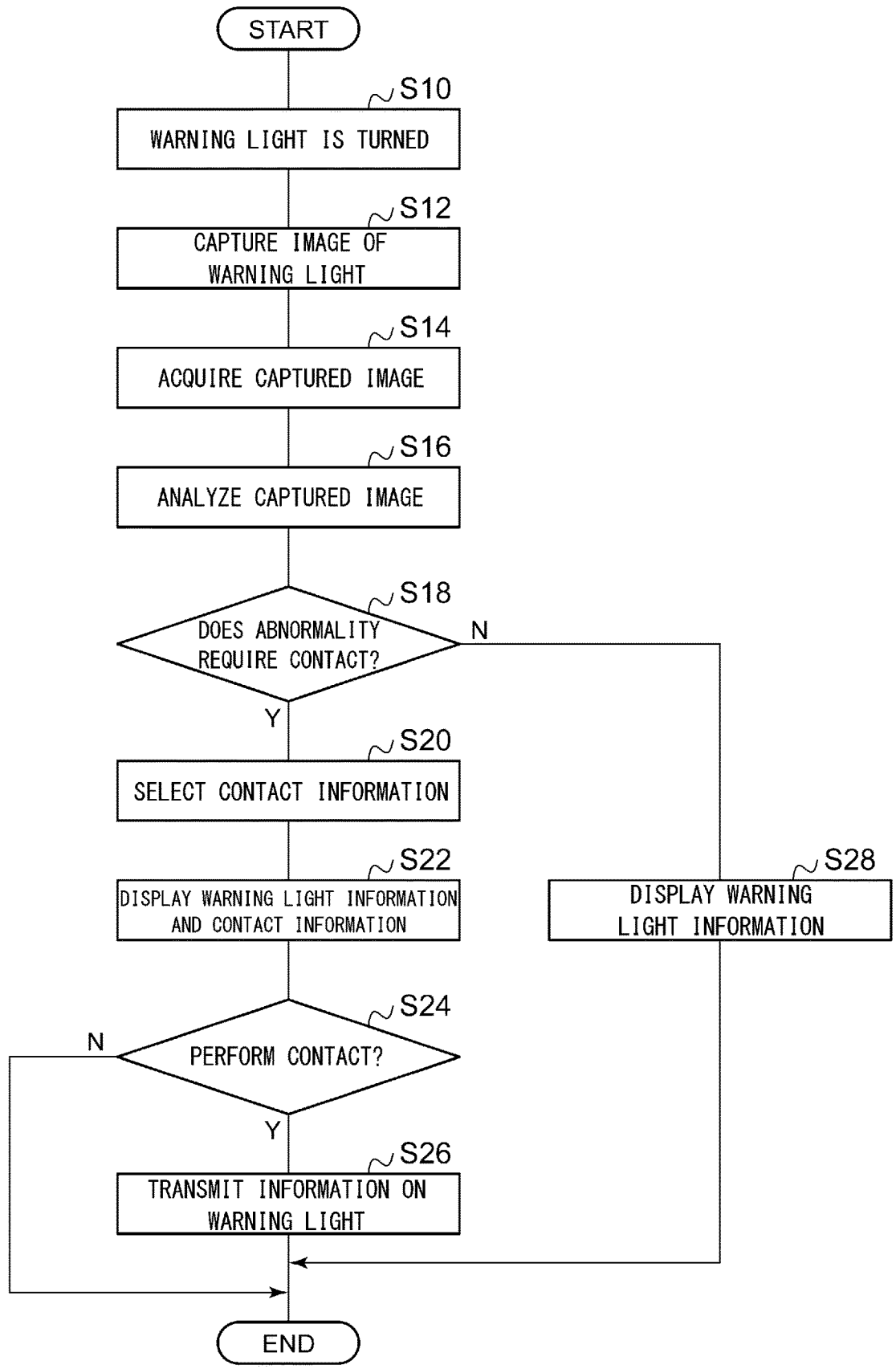
FIG. 3 is a flowchart for illustrating a process for showing an explanation about a warning light.

FIG. 3 is a flowchart for illustrating a process for showing an explanation about a warning light. The warning light of the vehicle driven by the driver is turned on (S10), and the driver captures an image of the warning light by using the camera 22 of the mobile terminal device 10 (S12). The image acquisition unit 32 of the program 20 for showing an explanation about a warning light acquires the captured image that includes the warning light (S14).

The analysis unit 34 analyzes the captured image thus acquired and identifies the warning light turned on or flashing that is included in the captured image. The selection unit 40 determines whether to make a contact to the maintenance facility 12 or the support center 14 based on the analysis result (S18). In other words, the selection unit 40 refers to the contact information data stored in advance and determines whether the abnormality indicated by the identified warning light requires contacting the maintenance facility 12 or the support center 14.

When the selection unit 40 determines that it is not necessary to make a contact based on the analysis result (N in S18), the display control unit 36 retrieves explanatory information corresponding to the information on the warning light identified from the warning light information storing unit 42, causes the explanatory information to be displayed on the display 24 (S28), and terminates the process. This allows the driver to understand the content indicated by the warning light that is turned on.

When the selection unit 40 determines that a contact should be made based on the analysis result (Y in S18), the selection unit 40 selects the maintenance facility 12 or the support center 14 based on the information on the warning light identified (S20). The display control unit 36 causes the explanatory information corresponding to the information on the warning light identified and the contact information selected by the selection unit 40 to be displayed on the display 24 (S22). This allows the driver to understand the content indicated by the warning light that is turned on and can make a contact merely with a touch operation on the contact information displayed.

When the driver does not make a contact to the maintenance facility 12 or the support center 14 (N in S24), the process is terminated. When the driver performs a touch operation in the user operation area 58 for making a contact to make a contact to the maintenance facility 12 or the support center 14 (Y in S24), the communication control unit 38 causes the information related to the identified warning light to be transmitted to the acknowledging unit of the maintenance facility 12 or the support center 14 (S26). This allows the driver to communicate smoothly with the operator of the maintenance facility 12 or the support center 14. The communication control unit 38 may cause the information related to the identified warning light to be transmitted to the maintenance facility 12 or the support center 14, even if the driver does not make a contact to the maintenance facility 12 or the support center 14.

The embodiment is intended to be illustrative only and it will be understood by those skilled in the art that various modifications to constituting elements could be developed and that such modifications are also within the scope of the present invention.

The embodiment has been described by way of showing a mode in which the analysis unit 34 identifies one warning light included in the captured image but is not limited to this mode. In the case a plurality of warning lights are included in the captured image, the analysis unit 34 may identify each of the plurality of warning lights turned on, and the display control unit 36 may cause the explanatory information on the plurality of warning lights identified to be displayed.

What is claimed is:

1. A method of showing an explanation about a warning light on a mobile terminal, comprising:
   using a camera of the mobile terminal, acquiring a captured image that captures a warning light of a vehicle;
   using programmed hardware of the mobile terminal, analyzing the captured image acquired, and identifying the warning light included in the captured image and a vehicle status indicated by the identified warning light;
   using the programmed hardware of the mobile terminal, selecting a maintenance facility or a support center for the vehicle based on the vehicle status indicated by the identified warning light and a seriousness of vehicle trouble indicated by the identified warning light;
   using a display of the mobile terminal, displaying information that explains the vehicle status indicated by the identified warning light; and using a transmitter of the mobile terminal, transmitting at least one of information related to the identified warning light and the captured image acquired to a predetermined external device.

2. The method of claim 1, wherein the predetermined external device is provided in the maintenance facility or the support center for the vehicle.

3. A memory containing a program that, when executed by hardware, causes the hardware to:
- acquire a captured image that captures a warning light of a vehicle;
- analyze the captured image acquired, and identify the warning light included in the captured image and a vehicle status indicated by the identified warning light;
- select a maintenance facility or a support center for the vehicle based on the vehicle status indicated by the identified warning light and a seriousness of vehicle trouble indicated by the identified warning light;
- cause information that explains the vehicle status indicated by the identified warning light to be displayed; and
- cause at least one of information related to the identified warning light and the captured image acquired to be transmitted to a predetermined external device.

* * * * *